United States Patent
Nakamoto et al.

(10) Patent No.: US 11,656,788 B2
(45) Date of Patent: May 23, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Katsuma Nakamoto, Kanagawa (JP); Fumiyoshi Kawase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/331,644

(22) Filed: May 27, 2021

(65) Prior Publication Data
US 2022/0155993 A1    May 19, 2022

(30) Foreign Application Priority Data
Nov. 13, 2020    (JP) .............................. JP2020-189715

(51) Int. Cl.
G06F 12/02    (2006.01)
G06F 3/06    (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

| 2014/0068220 A1* | 3/2014 | Osborn ............... G06F 12/0835 711/170 |
| 2015/0100822 A1* | 4/2015 | Ohno .................... G06F 3/0685 714/6.32 |
| 2022/0129571 A1* | 4/2022 | O'Brien, III ............ G06F 21/62 |

FOREIGN PATENT DOCUMENTS

JP    2015-141681    8/2015

* cited by examiner

*Primary Examiner* — Yong J Choe
(74) *Attorney, Agent, or Firm* — JCIPRNET

(57) ABSTRACT

An information processing apparatus includes a first memory, a second memory, and a processor configured to: change a data write destination from the first memory to the second memory when a write speed of data on the first memory becomes less than a speed threshold value; and perform an optimization process on the first memory in a state where the data write destination is the second memory, the optimization process optimizing a state of the first memory in such a manner as to restore the write speed of data on the first memory.

8 Claims, 2 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-189715 filed Nov. 13, 2020.

BACKGROUND

(i) Technical Field

The present disclosure relates to an information processing apparatus and a non-transitory computer readable medium.

(ii) Related Art

In general, there is a case where the write speed of data on a memory decreases as the writing of data on the memory is being repeated. The write speed is an index representing the amount of data that can be written on a memory per unit time. Factors causing a decrease in the write speed include, for example, a necessity of deleting old data before writing new data at the time of writing data in a data block where the old data were written, a division and storage of a single set of data into a plurality of non-continuous data blocks due to availability of free space in data blocks (fragmentation), and the like.

Because of this, in general, optimization processes are proposed to restore the write speed of data on a memory. The optimization processes include, for example, a process of deleting unnecessary data from data blocks in advance, a process of reorganizing data arrangement in a data block group (defragmentation), and the like.

Here, in order to exert an effect of the optimization process properly, the optimization process needs to be performed during a time period where no write process of data on a memory is performed. Therefore, in general, techniques are proposed to control timing of the optimization process. For example, Japanese Unexamined Patent Application Publication No. 2015-141681 discloses an image processing apparatus that performs an optimization process for a memory when the status of an input process instruction (job) is in a predetermined status. The foregoing predetermined status is, for example, in slow printing, in calibration, in standby for replenishment of papers for printing, in standby for toner refill, in standby for removal of a jam, in switching of paper feeder cassette, or the like. That is to say, in Japanese Unexamined Patent Application Publication No. 2015-141681, the optimization process is performed on a memory at the timing when writing of data on a memory is expected to be interrupted.

SUMMARY

As described above, the optimization process for restoring the write speed of data on a memory may need to be performed during a time period where no write process of data on a memory is performed. However, in general, in a situation where data are continuously written on a memory, it is difficult to perform the optimization process on the memory.

Aspects of non-limiting embodiments of the present disclosure relate to a technique that enables to perform an optimization process for restoring the write speed of data on a memory included in an information processing apparatus even in a situation where data are continuously written on the memory. Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first memory, a second memory, and a processor configured to: change a data write destination from the first memory to the second memory when a write speed of data on the first memory becomes less than a speed threshold value; and perform an optimization process on the first memory in a state where the data write destination is the second memory, the optimization process optimizing a state of the first memory in such a manner as to restore the write speed of data on the first memory.

BRIEF DESCRIPTION OF THE DRAWINGS

An exemplary embodiment of the present disclosure will be described in detail based on the following figures, wherein.

DETAILED DESCRIPTION

Figure 1:
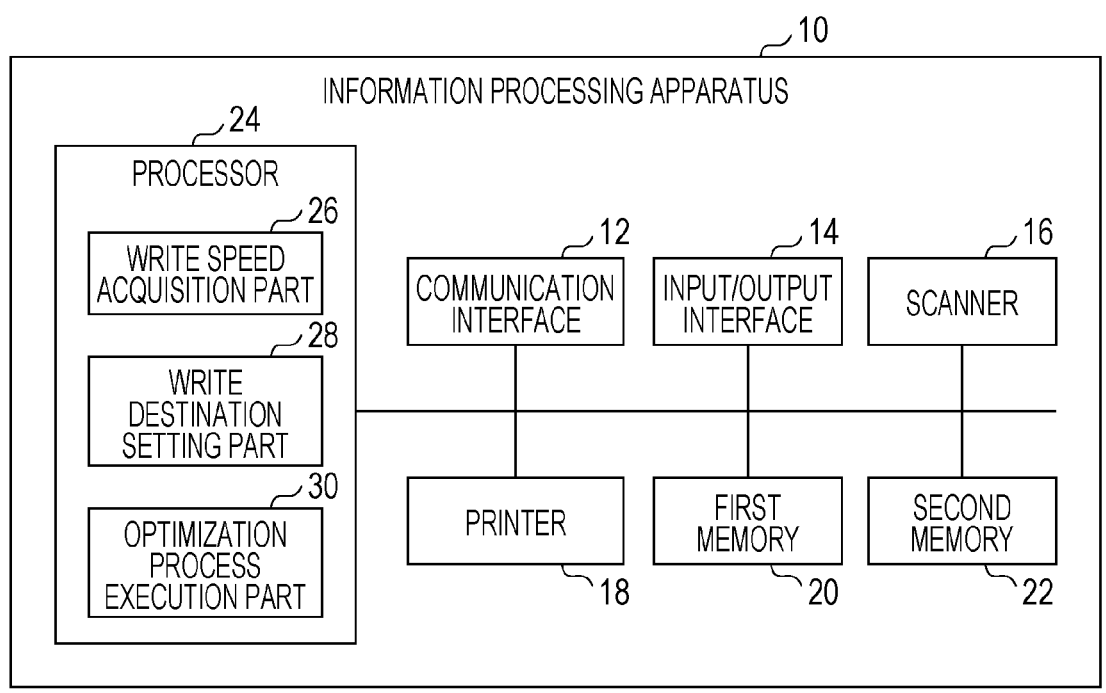
FIG. 1 is a schematic configuration diagram of an information processing apparatus according to a present exemplary embodiment.

FIG. 1 is a schematic configuration diagram of an information processing apparatus 10 according to the present exemplary embodiment. In the present exemplary embodiment, the information processing apparatus 10 is an apparatus that performs, in response to a job which is a process instruction input by a user, a process pertaining to the job (for example, a multifunction machine including a printing (print) function, scanning (image reading) function, a copy function, a FAX transmission function, and the like). However, the information processing apparatus 10 may be of any type so long as the apparatus includes plural memories, stores data into the plural memories, and may perform an optimization process on the memories. For example, the information processing apparatus 10 may be a personal computer, a server, or any other apparatus.

A communication interface 12 includes, for example, a network adapter and the like. The communication interface 12 has the capability of communicating with another apparatus (for example, a user terminal that another user uses) via a communication channel such as a local area network (LAN) or the like. Particularly, the communication interface 12 receives a job including data that serves as an object of a process from a user terminal. Such a job is, for example, a print job for causing the information processing apparatus 10 to perform a print process or any other similar job. The print job includes image data (that serves as an object of the print process) pertaining to this print job.

An input/output interface 14 includes, for example, an input interface such as a touch panel, buttons, and the like, and an output interface such as a display, a speaker, and the like.

The input interface is used to allow a user to input various instructions to the information processing apparatus 10. For example, after setting a paper document on a paper tray (not shown in the drawing) included in the information processing apparatus 10, a user may input a scan job through the input interface to cause the information processing apparatus 10 to perform a scan process. In response to the scan job, a scanner 16, which will be described below, optically reads the paper document set on the paper tray and obtains image data pertaining to the scan job. Similarly, a user may input, through the input interface, a copy job for causing the information processing apparatus 10 to perform a copy process (process for printing image data obtained by scanning a paper document on a print medium), a FAX job for causing the information processing apparatus 10 to perform a FAX transmission process (process for FAX-transmitting image data obtained by scanning a paper document), and the like.

The output interface is used for causing the information processing apparatus 10 to output a variety of information to a user. For example, a display that serves as the output interface displays various screens.

The scanner 16 includes, for example, a light source, a charge coupled device (CCD), and the like. The scanner 16 optically reads a paper document and generates image data corresponding to the paper document. As described above, when a user input a scan job, a copy job, or a FAX job to the information processing apparatus 10, the scanner 16 optically reads a paper document set on a paper tray and obtains image data pertaining to the job.

A printer 18 includes, for example, a charging device, a photoconductive drum, a toner, a print medium transport device, or the like. When a user inputs a print job to the information processing apparatus 10, the printer 18 forms an image on a print medium (that is to say, printing) based on the image data pertaining to this print job. When a user inputs a copy job to the information processing apparatus 10, the printer 18 forms an image on a print medium based on the image data obtained by the scanner 16 in response to this copy job.

A first memory 20 is a memory whose write speed may decrease by writing data thereon. As described above, the write speed is an index representing the amount of data that can be written on the first memory 20 per unit time.

For example, the first memory 20 may be a NAND memory. The NAND memory is, for example, a solid state drive (SSD), an embedded multimedia card (eMMC), a SD card, or the like. Note that the NAND memory is a nonvolatile memory and is a memory having a service life for writing. The service life for writing decreases by writing data on the first memory 20 and is a parameter determined based on the number of times of writing data on the first memory 20, the total amount of data written on the first memory 20, or the like, for the duration until no more data can be written on the first memory 20.

In the NAND memory, when writing new data on a data block where old data (unnecessary data) were written, the old data needs to be deleted. Therefore, as the write process of data on the first memory 20 is being repeated and the number of data blocks where unnecessary data were stored increases, the write speed of data on the first memory 20 decreases by the amount used by that data deletion process. Each data block of the NAND memory has a service life for writing. Thus, at the time of writing data, a process for leveling the number of times of writing to each data block (wear leveling) may be performed. In the wear leveling process, in the case where data stored in the first memory 20 needs to be moved to another data block and unnecessary data are stored in a destination data block, the unnecessary data need to be deleted before moving the data. Therefore, as the write process of data on the first memory 20 is being repeated and the number of data blocks where unnecessary data were written increases, the wear leveling process takes longer time to complete, and thus the write speed of data on the first memory 20 decreases.

The first memory 20 may alternatively be a magnetic disk such as a hard disk drive (HDD). Note that the magnetic disk is a nonvolatile memory and is a memory having no service life for writing. In the magnetic disk, as the write process of data is being repeated, non-continuous empty data blocks where no data are written are formed. In such case, a single set of data needs to be divided and stored into a plurality of non-continuous data blocks. Compared with the case where data are being written on continuous data blocks, in this case, the amount of movement of a magnetic head becomes greater, and this reduces the write speed of data on the first memory 20.

The first memory 20 is a memory to which an optimization process for restoring a reduced write speed can be applied.

For example, in the case where the first memory 20 is a NAND memory such as SSD or the like, a process called "TRIM" may be performed on the first memory 20 as an optimization process. TRIM is a process of deleting unnecessary data stored on the first memory 20 (for example, data that a user has issued a deletion command) in advance (that is to say, before determining new data to be written on a data block where the unnecessary data were written). TRIM allows to restore the write speed of data on the first memory 20 because this eliminates the need for deletion of old data at the time of writing the new data on the data block. At the time of performing the wear leveling process, the deletion process becomes also unnecessary when transferring data to another data block. This makes the wear leveling process more efficient. In total, the restoration of the write speed of data on the first memory 20 may be achieved.

For example, in the case where the first memory 20 is a magnetic disk such as HDD or the like, a process called "defragmentation" may be performed on the first memory 20 as an optimization process. Defragmentation is a process of reorganizing the arrangement of empty data blocks (and fragmented data fragments) in a continuous manner. This reduces the amount of movement of the magnetic head at the time of data writing and allows to restore the write speed of data on the first memory 20.

A variety of data are written on the first memory 20. In the present exemplary embodiment, data pertaining to a job input to the information processing apparatus 10 are written on the first memory 20. For example, when a print job is input to the information processing apparatus 10, image data included in the print job are written on the first memory 20. When a scan job, a copy job, or a FAX job is input to the information processing apparatus 10, image data, which are obtained by reading a paper document with the scanner 16 in response to the job, are written on the first memory 20.

An information processing program that causes respective parts of the information processing apparatus 10 to operate is stored in the first memory 20.

A second memory 22 is a memory that is provided separately from the first memory 20. The second memory 22 may be of any type. For example, the second memory 22 may be a nonvolatile memory such as a NAND memory or a magnetic disk or may be a volatile memory such as a DRAM. The second memory 22 may be a memory having a service life for writing such as a NAND memory or the like, or may be a memory having no service life for writing such as a magnetic disk. The storable capacity of the second memory 22 may be smaller than that of the first memory 20.

In FIG. 1, only one second memory 22 is illustrated. However, the information processing apparatus 10 may include a plurality of the second memories 22. In the case where a plurality of the second memories 22 is provided, the plurality of the second memories 22 may include a second memory 22 having a service life for writing and a second memory 22 having no service life for writing.

A variety of data are also written on the second memory 22. In the present exemplary embodiment, data pertaining to a job input to the information processing apparatus 10 are written on the second memory 22. As described above, in the information processing apparatus 10, the first memory 20 and the second memory 22 are provided as memories on which data (in the present exemplary embodiment, data pertaining to a job) are written. On which memory the data are to be written is determined by a processor 24 (more specifically, a write destination setting part 28) which will be described below.

The processor 24 refers to hardware in a broad sense. The processor 24 includes at least one of general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The processor 24 may be broad enough to encompass one processor or plural processors in collaboration which are located physically apart from each other but may work cooperatively. As illustrated in FIG. 1, by running the information processing program stored in the first memory 20, the processor 24 functions as a write speed acquisition part 26, a write destination setting part 28, and an optimization process execution part 30.

The write speed acquisition part 26 obtains the write speed of data on the first memory 20. In the present exemplary embodiment, at the time of actually writing data on the first memory 20, the write speed acquisition part 26 measures the amount of the data and the time taken to write the data on the first memory 20. After doing that, based on the amount of the data and the time taken to write the data, the write speed acquisition part 26 calculates the amount of data written on the first memory 20 per unit time. The write speed acquisition part 26 obtains this value calculated as above as the write speed of data on the first memory 20. The write speed of data on the first memory 20 includes a sequential write performance that is the write speed of data on continuous data blocks and a random write performance that is the write speed of data on non-continuous data blocks. In some cases, the sequential write performance and the random write performance have different values. In such a case, the write speed acquisition part 26 obtains at least one of the sequential write performance and the random write performance.

Note that the acquisition method of the write speed of data on the first memory 20 is not limited to the above and may use a different method. For example, in a process pertaining to a job, there is a step of writing data pertaining to the job on the first memory 20. Thus, the process speed of the job varies depending on the write speed of the data on the first memory 20. Accordingly, the write speed of data on the first memory 20 may be indirectly calculated based on the process speed of a job.

The write speed acquisition part 26 may obtain the write speed of data on the first memory 20 every time the data are written on the first memory 20 or may obtain the write speed intermittently. For example, the write speed acquisition part 26 may obtain the write speed of data on the first memory 20 at regular intervals (every several minutes, every several hours, or the like).

The write destination setting part 28 sets a data write destination to one of the first memory 20 and the second memory 22 based on the write speed of data on the first memory 20 obtained by the write speed acquisition part 26. Specifically, the write destination setting part 28 changes the data write destination from the first memory 20 to the second memory 22 when the write speed of data on the first memory 20 becomes less than a speed threshold value. Here, for example, the speed threshold value may be determined in advance by an administrator of the information processing apparatus 10 or the like.

In the case where the write speed acquisition part 26 obtains the sequential write performance and the random write performance as the write speed, a speed threshold value relating to the sequential write performance and a speed threshold value relating to the random write performance may be set separately. After doing so, the write destination setting part 28 changes the data write destination from the first memory 20 to the second memory 22 when one of the sequential write performance and the random write performance becomes less than the corresponding speed threshold value or when both the sequential write performance and the random write performance become less than the corresponding speed threshold values.

During the period where the data write destination is set to the second memory 22 by the write destination setting part 28, all data that have been planned to be written on the first memory 20 is written on the second memory 22. That is to say, no data are being written on the first memory 20.

In the state where the data write destination is the second memory 22, the optimization process execution part 30 performs, on the first memory 20, an optimization process that optimizes the state of the first memory 20 in such a manner as to restore the write speed of data on the first memory 20. In the present exemplary embodiment, the optimization process execution part 30 sends an optimization process instruction to the first memory 20 to cause the first memory 20 to perform an actual process for optimization. As described above, the optimization process is, for example, TRIM in the case where the first memory 20 is a NAND memory, and defragmentation in the case where the first memory 20 is an HDD.

As described above, in the state where the data write destination is the second memory 22, no data are being written on the first memory 20, and thus the optimization process for the first memory 20 (specifically, the actual process for optimizing the first memory 20) may be performed properly. Note that in the case where data are being read out from the first memory 20, the optimization process for the first memory 20 may not be performed properly in some cases. However, with a precondition that no data are read out from the first memory 20, the optimization process for the first memory 20 may be performed properly, at least, even in the period where data are being written on the second memory 22. In addition, even in the period where the optimization process is being performed on the first memory 20, data are being written on the second memory 22, and thus a process that uses such data may not be interrupted in the information processing apparatus 10.

In the case where a plurality of the second memories 22 is provided in the information processing apparatus 10, when the write speed of data on the first memory 20 becomes less than a speed threshold value in the state where the data write destination is the first memory 20, first, the write destination setting part 28 obtains information relating to the plurality of the second memories 22 included in the information processing apparatus 10. The information relating to the plurality of the second memories 22 includes information representing the memory type (SD card, eMMC, DRAM, or the like) of each second memory 22 and the free space of each second memory 22. By obtaining the memory type of the second memory 22, the write destination setting part 28 may determine whether this second memory 22 is a memory having a service life for writing or a memory having no service life for writing.

Of the plurality of the second memories 22, the write destination setting part 28 selects the second memory 22 that serves as the data write destination after the change based on the obtained information relating to the plurality of the second memories 22.

Specifically, the write destination setting part 28 selects the data write destination after the change from the plurality of the second memories 22 by giving priority to the second memory 22 having no service life for writing over the second memory 22 having a service life for writing. For example, in the case where the second memories 22 include an eMMC (having a service life for writing) and a DRAM (having no service life for writing), the write destination setting part 28 selects the DRAM over the eMMC as the data write destination after the change. By giving priority to the second memory 22 having no service life for writing at the time of selection, the reduction of the service life for writing of the second memory 22 may be suppressed when writing data on the second memory 22.

Furthermore, from the second memories 22 each having free space greater than or equal to a free space threshold value, the write destination setting part 28 selects the second memory 22 that serves as the data write destination after the change. In other words, when the write speed of data on the first memory 20 becomes less than the speed threshold value, the write destination setting part 28 does not change the data write destination in the case where the free space of each of the plurality of the second memories 22 is less than the free space threshold value. Here, for example, the free space threshold value may also be determined in advance by an administrator of the information processing apparatus 10 or the like. For example, in the case where the information processing apparatus 10 is an image processing apparatus, the free space threshold value is set to a value nearly equal to the total amount of data pertaining to several to several tens of jobs (for example, 300 MB or the like). By selecting the second memory 22 having free space greater than or equal to the free space threshold value, it may become possible to suppress the occurrence of cases where the free space of the second memory 22 is used up and no more data can be written on the second memory 22 when data are written on the second memory 22.

For example, suppose a case where the second memories 22 include an eMMC (having a service life for writing) having free space of 400 MB and a DRAM (having no service life for writing) having free space of 200 MB and the free space threshold value is set to 300 MB. In this case, originally, the DRAM would be selected over the eMMC as the data write destination after the change. However, because the free space of the DRAM is less than the free space threshold value, the write destination setting part 28 selects the eMMC as the data write destination after the change. If, in the foregoing example, the free space of the eMMC is also less than the free space threshold value, the write destination setting part 28 does not change the data write destination.

After the optimization process execution part 30 completes the optimization process for the first memory 20, the write destination setting part 28 changes (returns) the data write destination to the first memory 20 from the second memory 22. This allows data to be written again on the first memory 20 whose write speed has been restored.

After changing the data write destination from the first memory 20 to the second memory 22 and starting the writing of a certain data set (for example, data pertaining to a single job) on the second memory 22, during the execution of write process of the certain data set, the write destination setting part 28 may avoid changing the data write destination from the second memory 22 to the first memory 20. If the data write destination was changed to the first memory 20 during the course of writing a single data set on the second memory 22, part of the single data set would be written on the second memory 22, and the remaining part of the single data set would be written on the first memory 20. As a result, when such data set is being read, the memory from which data are to be read will be changed along the way, and this may cause inconvenience. For example, in the case a data set pertaining to a job is divided and stored on the first memory 20 and the second memory 22, it would take longer time to read the data set compared with the case where the data set is stored in a single memory, and this may increase the time to process the job in some cases. Accordingly, in order to prevent a data set from being divided and written on a plurality of memories, the change of the data write destination to the first memory 20 may be avoided during the execution of write process of the data set.

Similarly, from the viewpoint of preventing a data set from being divided and written on a plurality of memories, the write destination setting part 28 may avoid changing the data write destination from the first memory 20 to the second memory 22 during the writing of the data set on the first memory 20.

Figure 2:
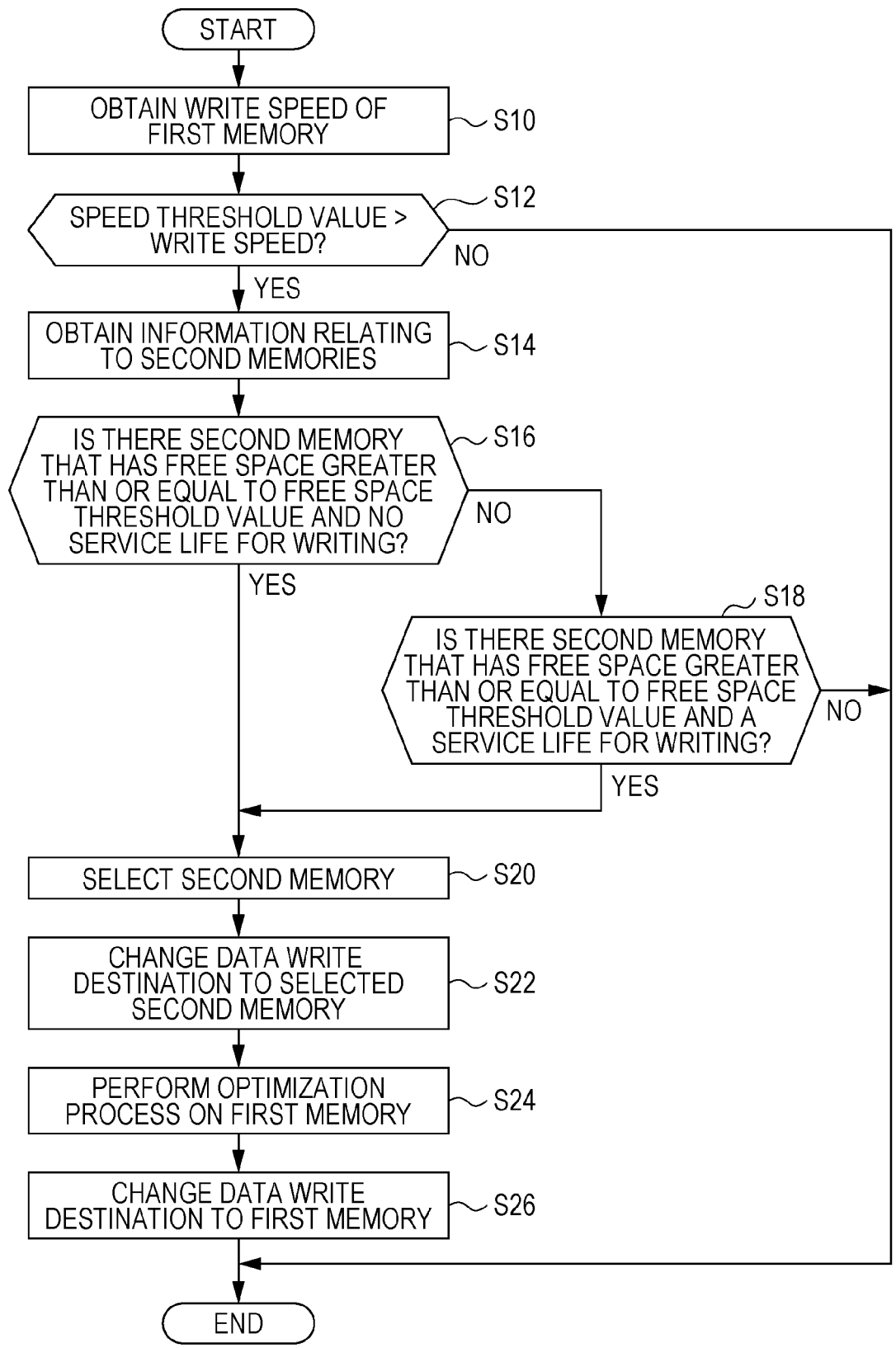
FIG. 2 is a flowchart illustrating a flow of process in the information processing apparatus according to the present exemplary embodiment.

The outline of the information processing apparatus 10 according to the present exemplary embodiment has been described. In the following part, a flow of process of the information processing apparatus 10 is described in accordance with a flowchart illustrated in FIG. 2.

In step S10, the write speed acquisition part 26 obtains the write speed of the first memory 20.

In step S12, the write destination setting part 28 determines whether or not the write speed of the first memory 20 obtained in step S10 is less than a speed threshold value. When the write speed of the first memory 20 is not less than the speed threshold value, the process ends (that is to say, the data write destination is not changed from the first memory 20). When the write speed of the first memory 20 is less than the speed threshold value, the process proceeds to step S14.

In step S14, the write destination setting part 28 obtains information relating to a plurality of the second memories 22 included in the information processing apparatus 10.

In step S16, based on the information relating to the plurality of the second memories 22 obtained in step S14, the write destination setting part 28 determines whether or not there is the second memory 22 that has the free space greater than or equal to a free space threshold value and no service life for writing (for example, a DRAM) in the plurality of the second memories 22. When there is no such second memory 22, the process proceeds to step S18, and when there is such second memory 22, the process proceeds to step S20.

In step S18, based on the information relating to the plurality of the second memories 22 obtained in step S14, the write destination setting part 28 determines whether or not there is the second memory 22 that has the free space greater than or equal to the free space threshold value and a service life for writing (for example, an SSD or eMMC) in the plurality of the second memories 22. When there is such second memory 22, the process proceeds to step S20, and when there is no such second memory 22, the process ends (that is to say, the data write destination is not changed from the first memory 20).

In step S20, the write destination setting part 28 selects the second memory 22 that serves as the data write destination after the change. When there is the second memory 22 that has free space greater than or equal to the free space threshold value and no service life for writing (YES in step S16), the write destination setting part 28 selects this second memory 22 having no service life for writing as the data write destination after the change. Note that when there is a plurality of second memories 22 that each have free space greater than or equal to the free space threshold value and no service life for writing, the write destination setting part 28 may select one of such second memories 22 (for example, the second memory 22 having the largest free space). When there is no second memory 22 that has free space greater than or equal to the free space threshold value and no service life for writing and there is the second memory 22 that has free space greater than or equal to the free space threshold value and a service life for writing (NO in step S16 and YES in step S18), the write destination setting part 28 selects this second memory 22 having a service life for writing as the data write destination after the change. Note that when there is a plurality of second memories 22 that each have free space greater than or equal to the free space threshold value and a service life for writing, the write destination setting part 28 may select one of such second memories 22 (for example, the second memory 22 having the largest free space).

In step S22, the write destination setting part 28 changes the data write destination to the second memory 22 selected in step S20.

In step S24, the optimization process execution part 30 performs an optimization process on the first memory 20.

In step S26, the write destination setting part 28 changes the data write destination from the second memory 22 to the first memory 20.

The exemplary embodiment of the present disclosure has been described. However, the present disclosure is not limited to the foregoing embodiment, and various modifications may be made without departing the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a first memory;
   a second memory; and
   a processor configured to:
   change a data write destination from the first memory to the second memory when a write speed of data on the first memory becomes less than a speed threshold value; and
   perform an optimization process on the first memory after the data write destination is changed from the first memory to the second memory, the optimization process optimizing a state of the first memory in such a manner as to restore the write speed of data on the first memory, wherein
   the second memory is one of a plurality of second memories,
   the plurality of second memories includes a second memory having a service life for writing and a second memory having no service life for writing, and
   when the write speed of data on the first memory becomes less than the speed threshold value, the processor is configured to select the data write destination after the change from the plurality of second memories by giving priority to the second memory having no service life for writing over the second memory having a service life for writing.

2. The information processing apparatus according to claim 1, wherein
   the processor is configured to change the data write destination from the second memory to the first memory after completing the optimization process.

3. The information processing apparatus according to claim 2, wherein
   after the data write destination is changed from the first memory to the second memory and writing of a data set on the second memory is started, the processor is configured not to change the data write destination from the second memory to the first memory during an execution of a write process of the data set.

4. The information processing apparatus according to claim 1, wherein
   the processor is configured not to change the data write destination from the first memory to the second memory during an execution of a write process of a data set on the first memory.

5. The information processing apparatus according to claim 1, wherein
   when the write speed of data on the first memory becomes less than the speed threshold value, the processor is configured not to change the data write destination in a case where free space of each of the plurality of second memories is less than a free space threshold value.

6. The information processing apparatus according to claim 1, wherein the processor is configured to:
   perform a process in response to a process instruction input to the information processing apparatus; and
   change a data write destination pertaining to the process instruction input to the information processing apparatus from the first memory to the second memory when the write speed of data on the first memory becomes less than the speed threshold value.

7. A non-transitory computer readable medium storing a program causing a computer including a first memory and a second memory to execute a process, the process comprising:
- changing a data write destination from the first memory to the second memory when a write speed of data on the first memory becomes less than a speed threshold value; and
- performing an optimization process on the first memory after the data write destination is changed from the first memory to the second memory, the optimization process optimizing a state of the first memory in such a manner as to restore the write speed of data on the first memory, wherein
- the second memory is one of a plurality of second memories,
- the plurality of second memories includes a second memory having a service life for writing and a second memory having no service life for writing, and
- when the write speed of data on the first memory becomes less than the speed threshold value, the data write destination is selected after the change from the plurality of second memories by giving priority to the second memory having no service life for writing over the second memory having a service life for writing.

8. An information processing apparatus comprising:
first storing means;
second storing means;
- changing means for changing a data write destination from the first storing means to the second storing means when a write speed of data on the first storing means becomes less than a speed threshold value; and
- performing means for performing an optimization process on the first storing means after the data write destination is changed from the first storing means to the second storing means, the optimization process optimizing a state of the first storing means in such a manner as to restore the write speed of data on the first storing means, wherein
- the second storing means is one of a plurality of second storing means,
- the plurality of second storing means includes a second storing means having a service life for writing and a second storing means having no service life for writing, and
- when the write speed of data on the first storing means becomes less than the speed threshold value, the data write destination is selected after the change from the plurality of second storing means by giving priority to the second storing means having no service life for writing over the second storing means having a service life for writing.

* * * * *